United States Patent
Carley

(10) Patent No.: US 6,845,242 B1
(45) Date of Patent: Jan. 18, 2005

(54) CORDLESS TELEPHONE SYSTEM

(75) Inventor: Jeffrey A. Carley, Colorado Springs, CO (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/433,530

(22) Filed: Nov. 4, 1999

(51) Int. Cl.[7] .............................. H04Q 7/20; H04B 5/00

(52) U.S. Cl. ...................... 455/462; 455/463; 455/464; 455/465; 455/416; 455/555; 455/41.2; 455/41.3

(58) Field of Search .................. 455/555, 462, 455/463, 464, 465, 41, 569, 575, 66, 74, 416, 74.1

(56) References Cited

U.S. PATENT DOCUMENTS

| | | | | |
|---|---|---|---|---|
| 4,363,935 A | * | 12/1982 | Toya | 179/2 EA |
| 4,829,500 A | * | 5/1989 | Saunders | 369/5 |
| 5,177,784 A | * | 1/1993 | Hu | 379/430 |
| 5,758,289 A | * | 5/1998 | Lipp | 455/462 |
| 5,771,438 A | * | 6/1998 | Palermo | 455/41 |
| 5,809,417 A | * | 9/1998 | Nealon | 455/426 |

* cited by examiner

Primary Examiner—Vivian Chin
Assistant Examiner—Eugene Yun

(57) ABSTRACT

A low cost cordless telephone system including a base unit, connected to a telephone network, which can transmit and receive RF signals to and from sub-communicating devices. The sub-communicating devices include a cordless microphone for converting acoustical signals to electrical signals and providing same to a transmitter which transmits corresponding simplex RF signals on a cordless telephone frequency to a base unit attached to a telephone network; and a cordless speaker which receives simplex RF signals from a base unit and broadcasts a corresponding telephone conversation. The base unit may connect directly to a telephone network or, in an alternate embodiment, to the handset jack of an existing telephone, thereby interfacing to existing phones including those connected to digital telephone systems. The base unit may also include a speaker used to broadcast the telephone conversation. The base unit speaker and the cordless speaker each may optionally broadcast both sides of the phone conversation, including the presenter's speech received from the cordless microphone. The system may also be interfaced to an existing sound system via a remote interface unit or the base unit.

21 Claims, 2 Drawing Sheets

CORDLESS TELEPHONE SYSTEM

BACKGROUND OF THE INVENTION

1. Field of the Invention

The present invention relates generally to a cordless telephone system, and more particularly to a cordless telephone system with one or more communicating devices particularly suited for use in a conference room or auditorium setting.

2. Discussion of the Related Art

Cordless telephone systems generally include a base unit and a handset which communicate using Radio Frequency (RF) signals. The base unit is connected to a telephone network, such as the Public Switched Telephone Network (PSTN), while the handset can be removed from the base unit and used within a predetermined range, which is limited by the RF signal strength and not cord length. The transmission from the handset to the base unit is typically on a different frequency than the transmission from the base unit to the handset, providing duplex communications.

While existing cordless telephone systems offer additional conveniences over conventional corded phones, such as mobility, there is currently no convenient method of transmitting the voice of a person or speaker, referred to hereinafter as a presenter, to a telephone network to conduct a clear telephone conversation in a conference room or auditorium setting. Speakerphones may of course be used for this purpose, however, speakerphones are often less than ideal because they restrict the movement of the presenter, who may not always want to stay near the speakerphone. In addition, speakerphones will often pick-up considerable background noise in a conference room or auditorium setting.

A presenter could carry a corded telephone handset or a cordless telephone handset to transmit the presenter's voice to a telephone network while moving around, but this is usually not practical because it substantially restricts the ability of the presenter to use his or her hands for other purposes. Additionally, the presenter's audience generally cannot hear the party at the other end of the telephone conversation when a handset is used.

Where a sound system is being used to broadcast the presenter's speech, the system can, in theory, be connected to a telephone line, but this is often difficult, expensive or otherwise impractical. Also, a telephone jack may not be available in many auditoriums or conference rooms.

A further disadvantage of current cordless telephone systems is the incompatibility of the base units with digital telephone systems provided by a number of PBX's.

Therefore, a need exists for a low cost cordless telephone system which provides a convenient method of transmitting a presenter's voice to a telephone network to conduct a clear telephone conversation in a conference room or auditorium setting while also allowing an audience to hear the conversation with the other party to the telephone conversation.

SUMMARY OF THE INVENTION

It is therefore an object of the present invention to provide a low cost cordless telephone system for use by a presenter without restricting the presenter's mobility.

It is another object of the present invention to provide a low cost cordless telephone system that transmits a presenter's voice to a telephone network to conduct a clear telephone conversation in a conference room or auditorium setting.

It is yet another object of the present invention to provide a low cost cordless telephone system that transmits both the presenter's voice and the voice of the other conversing parties on the telephone conversation over a cordless speaker.

It is still another object of the present invention to provide a low cost cordless telephone system that interfaces to a sound system to achieve all the above objectives.

It is still another object of the present invention to provide a low cost cordless telephone system that interfaces with digital telephone systems to achieve all the above objectives.

To achieve the above objects, a cordless telephone system in accordance with the present invention is provided which includes a base unit, connected to a telephone network, which can transmit and receive RF signals to and from sub-communicating devices. The sub-communicating devices are more specialized than a general purpose handset and include a cordless microphone for converting acoustical signals to electrical signals and providing the electrical signals to a transmitter which transmits corresponding simplex RF signals unidirectionally on a cordless telephone frequency to the base unit attached to the telephone network; and a cordless speaker which unidirectionally receives simplex RF signals from the base unit and broadcasts a corresponding telephone conversation.

The base unit may connect directly to a telephone network or, in an alternate embodiment, to the handset jack of an existing telephone, thereby interfacing to existing phones, including those connected to digital telephone systems. The base unit may also include a speaker used to broadcast the telephone conversation. The base unit speaker and the cordless speaker each may optionally broadcast both sides of the phone conversation, including the presenter's speech received from the cordless microphone.

The microphone is preferably adapted to be worn by the presenter or other person, but may be a hand held cordless microphone or an headset microphone. The microphone's transmitter is also preferably adapted to be worn by the presenter and is electrically connected to the microphone to receive the electrical audio signals, to convert the electrical audio signals to RF signals, and to transmit the RF signals.

The base unit is remote from both the microphone and the transmitter and receives the RF signals from the transmitter and converts the RF signals to electrical telephone network signals corresponding to the acoustical signals from the presenter. The base unit is connected to a telephone network to transmit the electrical telephone network signals to the network and to receive electrical telephone network signals from the network that correspond to other telephone communications on the network.

The base unit preferably receives the RF signals in a selectable one of a plurality of predetermined frequency channels, and the transmitter preferably transmits the RF signals in a selected one of the plurality of frequency channels selectable within the transmitter. In addition, the cordless telephone system may include one or more separate, wireless speakers that, using RF signals received from the base unit, broadcasts both sides of the phone conversation, including the presenter's speech received from the cordless microphone and the electrical telephone network signals.

In a preferred embodiment, the wireless speaker may also have suitable connections to connect the wireless speaker to an available sound system, allowing the telephone conversation to be broadcast throughout a larger area over a pre-existing speaker system. The addition of the separate cordless speaker would also address the situation where a telephone jack either is not available or is not conveniently located in the room where the presenter is speaking.

In another preferred embodiment, the cordless telephone system also includes a sound system interface unit (SSIU), which provides duplex communications between the base unit and a sound system. The sound system's microphone(s) and speaker(s) then become part of the cordless telephone system, while the SSIU transmits and receives RF signals to and from the base unit. The base unit may optionally be connected to the sound system.

The cordless telephone system may also include a cordless headset, i.e. microphone and ear phone combination, as a duplex sub-communicating device. The microphone would perform the microphone functions described above and the earphones would broadcast the telephone conversation.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION OF THE PREFERRED EMBODIMENTS

Figure 1:
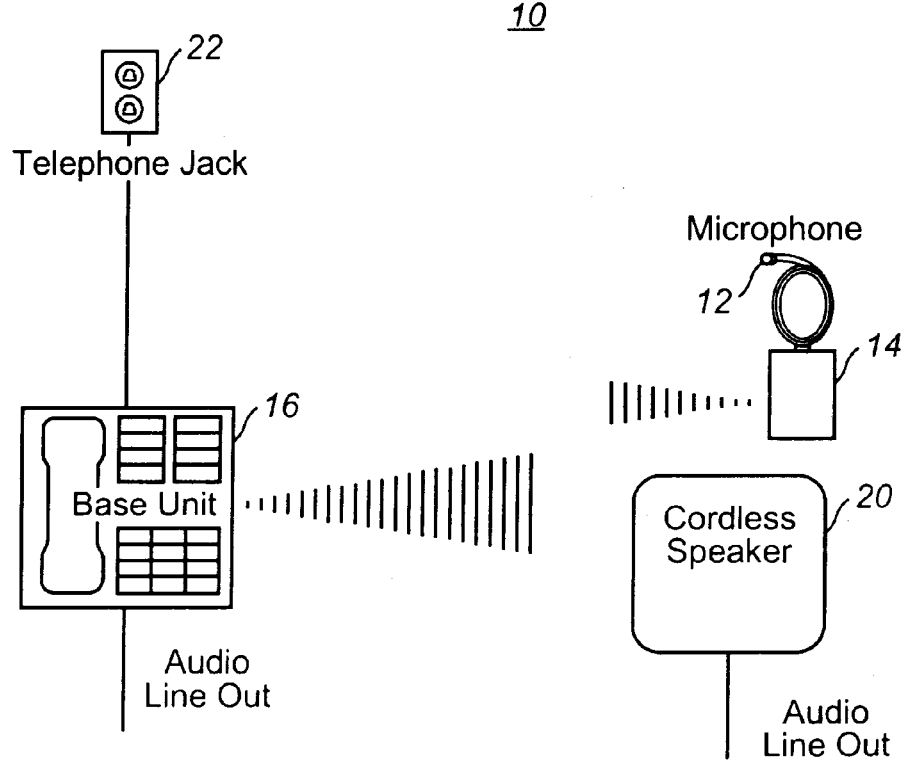
FIG. 1 illustrates a cordless telephone system in accordance with an embodiment of the present invention.

Turning now to the drawings, in which like reference numerals identify similar or identical elements throughout the several views, FIG. 1 illustrates a cordless telephone system 10 comprising a microphone 12, transmitter 14, and base unit 16. FIG. 1 also includes a cordless speaker 20 that may optionally be used in system 10, and a telephone jack 22 for connecting base unit 16 to a telephone network, such as the PSTN. Generally, microphone 12 is adapted to be worn by an individual or, more clearly, a presenter, such as a lapel type microphone, and is used to receive acoustical signals from the presenter and to convert the acoustical signals to corresponding electrical audio signals. The transmitter 14 is also adapted to be worn by the presenter and is electrically connected to the microphone 12 via wire to receive the electrical audio signals, to convert the electrical audio signals to RF signals, and to transmit the RF signals.

The base unit 16 is remote from the microphone 12 and the transmitter 14, that is, the base unit is not physically connected to either the microphone 12 or the transmitter 14. The base unit 16 receives the RF signals from the transmitter 14 on a receiving frequency and converts the RF signals to telephone network signals corresponding to the acoustical signals from the presenter. Also, the base unit 16 is connected to a telephone network via the telephone jack 22 to transmit the telephone network signals to the network and to receive telephone network signals from the network that correspond to other audible telephone communications. The base unit 16 optionally includes a built in speaker to broadcast the telephone conversation.

The cordless speaker 20 is remote from the base unit 16, microphone 12 and transmitter 14. When the cordless speaker 20 is used in system 10, the base unit 16 includes a base unit transmitter, similar to the transmitter 14 for the microphone to transmit RF signals on a transmit frequency, different from the receive frequency, to the cordless speaker 20. The telephone base unit transmitter transmits RF signals representing the telephone communications received by the telephone base unit 16 from the telephone network and also, optionally, the RF signals corresponding to the acoustical signals received from the presenter. The cordless speaker 20 converts the received RF signals into electrical audio signals to broadcast them over the speaker. Additionally, the cordless speaker 20 includes an 'audio out' jack to facilitate connection to a conventional sound system 'line in' jack via a cable, thereby providing corresponding electrical audio signals to the sound system as well and allowing the telephone conversation to be heard over the sound system throughout a larger area.

In the embodiment of the present invention illustrated in FIG. 1, base unit 16 is a typical cordless telephone base, preferably with speakerphone capabilities. However, in lieu of the cordless handset, the base unit 16 receives signals from the cordless microphone 12, via transmitter 14. Also, optionally base unit 16 may include a base unit transmitter to transmit RF signals to one or more cordless speakers 20. The base unit is connected to an AC power source, and is connected to a telephone network via jack 22. In use, the signals received from the cordless microphone 12 are ultimately transmitted to the telephone network, and the signals received on the telephone network are ultimately reproduced as audio on the speaker in the base unit 16 and/or one or more cordless speakers 20.

Base unit 16 may be provided with many features commonly known in the art. For example, preferably, the speaker on the base unit 16 can be muted and can also be used for initiating and receiving telephone calls, where a numeric keypad is provided. Further, base unit 16 may also include 'audio out' connections for connection to a 'line in' jack of a conventional sound system, thereby providing corresponding electrical audio signals to the sound system as well and allowing the telephone conversation to be heard over the sound system throughout a larger area.

Figure 2:
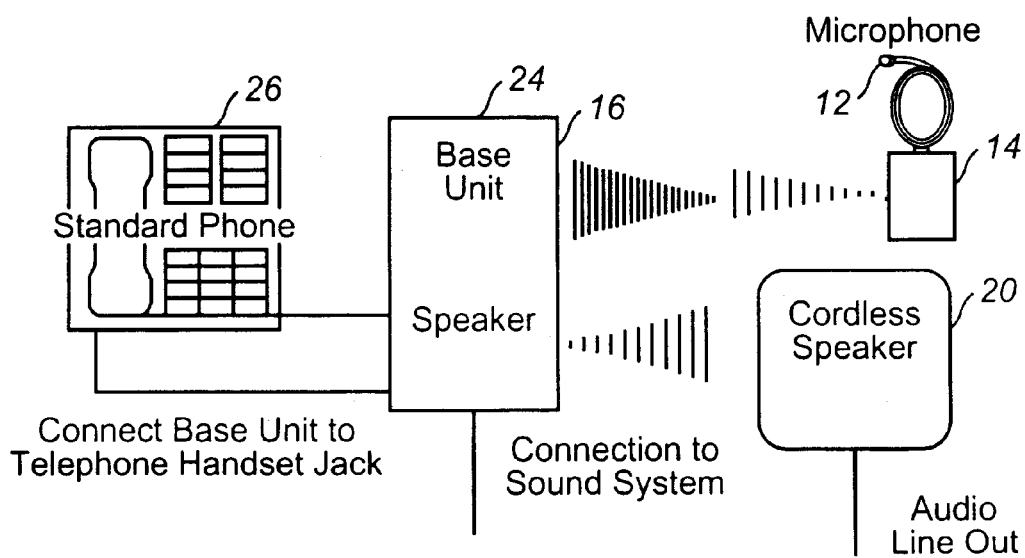
FIG. 2 illustrates an alternate connection for the base unit of the cordless telephone system of FIG. 1 in accordance with another embodiment of the present invention.

FIG. 2 illustrates an alternative embodiment. Referring to FIG. 2, the base unit 24 is designed to be attached to the handset jack of a corded telephone 26, and the base unit 24 provides a jack for the handset's cord to plug into. In this exemplary embodiment, the corded telephone 26 provides all the call set-up functions, and the base unit 24 is used to receive the signals from the wireless microphone 12 and to transmit to the cordless speaker 20. The base unit 24 obtains access to the telephone network through the corded telephone 26 by duplicating the functions of the corded handset 26 and otherwise duplicates the functions of the base unit 16 of FIG. 1 described above. The base unit 24 similarly provides connection to conventional sound systems. The base unit 24 is also connected to a suitable AC power source.

The configuration shown in FIG. 2 has the added advantage of adapting quickly to virtually any telephone system on any telephone network. For instance, a presenter may add the cordless phone capabilities described above to a phone residing on a digital phone network in a hotel or conference center.

With reference again to FIG. 1, the cordless microphone 12 may, for example, be a lapel microphone connected by a wire to a belt pack that houses the transmitter 14 along with batteries which provide DC power to the transmitter 14. Any suitable means may be used to secure microphone 12 and transmitter 14 to the presenter. Also, preferably, base unit 16 receives RF signals from transmitter 14 in a user selectable one of a plurality of predetermined frequency channels, and the transmitter 14 is designed to transmit RF signals in a selected one of the predetermined frequency channels, user selectable on the transmitter 14. Additionally, the transmitter 14 transmits the RF signal to the base unit 16 on a receive frequency of the base unit 16 and is a simplex sub-communicating device. Only one transmitter 14 may be used within the cordless phone system to avoid interference between received signals at the base unit 16. The transmitter 14 is a simplex sub-communicating device in the cordless telephone system.

The cordless speaker 20 is connected to a source of AC power and includes a receiver to receive the RF signals from the base unit 16 or base unit 24, and a speaker and amplifier with a volume control. Cordless speaker 20 may also be provided with jacks for connection to a sound system as described above. The cordless speaker 20 is a simplex sub-communicating device which receives the RF signals from the base unit 16 on a transmit frequency of the base unit 16, which is also selectable at both the base unit 16 and the cordless speaker 20. Unlike the microphone transmitter 14, multiple cordless speakers may be used simultaneously on the cordless phone system, all set to the same transmit frequency of the base unit 16. There is no fear of interference since each receiver is receiving a single, as opposed to multiple, RF signal.

Figure 3:
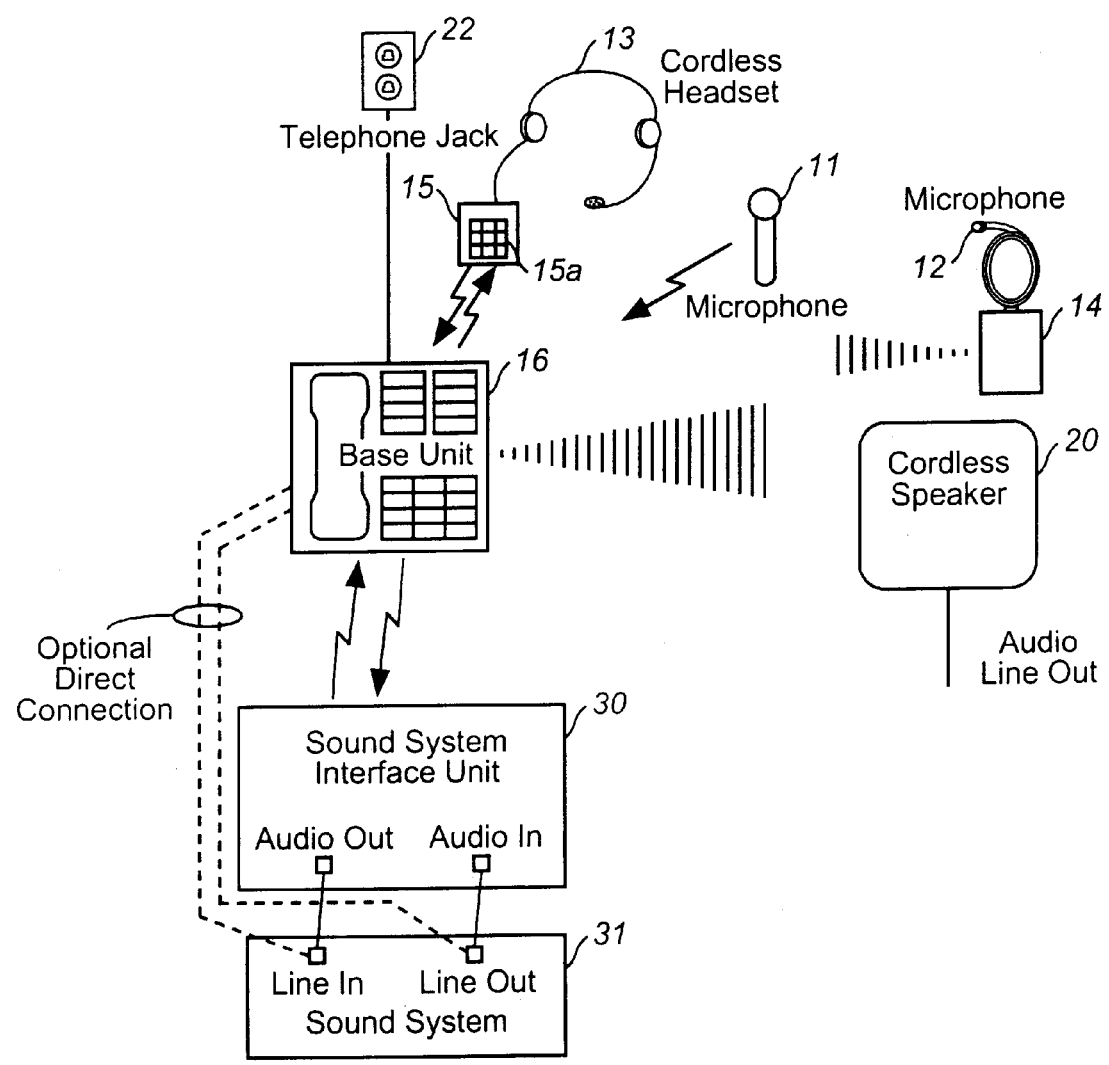
FIG. 3 illustrates a cordless telephone system including additional sub-communicating devices in accordance with yet another embodiment of the present invention.

FIG. 3 illustrates a cordless telephone system including additional sub-communicating devices in accordance with yet another embodiment of the present invention. Referring to FIG. 3, a cordless phone system includes a base unit 16 and both simplex and duplex sub communicating devices. A duplex sub communicating device shown is the SSIU 30, which provides duplex communications between the base unit 16 and a sound system 31. The SSIU 30 includes 'audio out' and 'audio in' jacks which connect via cables to a sound system's 'line in' and 'line out' jacks respectively. The sound system's microphone(s) and speaker(s) then become part of the cordless telephone system, substituting for the microphones and speakers in the cordless system with the SSIU transmitting and receiving RF signals to and from the base unit 16 accordingly. The base unit 16 may also optionally include 'audio out' and 'audio in' jacks for direct connection to the sound system 31 from the base unit 16.

The system of FIG. 3 may utilize one of a cordless microphone 12 and transmitter 14, a hand held or stand held cordless microphone 11, and a cordless headset 13. The cordless headset 13 may include a microphone and ear phone, as a bi-directional sub-communicating device. The cordless headset 13 is electrically connected to a transceiver 15 and includes a microphone to convert received acoustical signals to corresponding electrical audio signals. The transceiver 15 is adapted to be worn by the presenter and receives the electrical audio signals and converts the electrical audio signals to RF signals and transmits the RF signals to the base unit 16. The transceiver 15 also receives RF signals from the base unit 16, and converts them to electrical audio signals for broadcasting by the earphones in the cordless headset 13. The transceiver transmits and receives the RF signals on separate user selectable frequencies corresponding to a receive and transmit frequency of the base unit 16 respectively. The transceiver 13 may also optionally include a keypad 15a to facilitate call setup functions on the base unit from a remote location. One or more cordless speakers 20 may be provided.

The systems illustrated above are subject to the limitation of supporting a maximum of one transmitting sub-communicating device, such as a cordless microphone 11, 12, cordless headset 13(microphone portion), and SSIU 30 ('audio in' portion), while supporting multiple receiving sub-communicating devices, such as cordless speakers 20, cordless headset 13(earphone portion), and SSIU 30 ('audio out' portion).

The present invention provides low cost simplex communications between the base unit 16 and a number of specialized sub-communicating devices. Even the duplex devices may be viewed as a combination of a transmitting specialized sub-communicating device with a receiving specialized sub-communicating device. This unique feature of the present invention allows for a simple, low cost realization of the required circuitry.

While the present invention has been described in detail with reference to the preferred embodiments, they represent mere exemplary applications. Thus, it is to be clearly understood that many variations can be made by anyone of ordinary skill in the art while staying within the scope and spirit of the present invention as defined by the appended claims.

What is claimed is:

1. A cordless telephone system, comprising:
   a base unit to access a telephone network; and
   a transmitter based simplex (TBS) communicating device with a radio frequency (RF) transmitter,
   wherein the base unit includes a receiver, to receive TBS RF signals transmitted by the TBS communicating device transmitter, and the base unit converts the received TBS RF signals to a corresponding electrical signal to communicate on the telephone network, and converts the received TBS RF signals to a receiver based simplex (RBS) RF signal that is capable of being received and broadcast by a plurality of receiver based simplex (RBS) communicating devices.

2. The cordless telephone system recited in claim 1, wherein the TBS communicating device is a cordless microphone which converts acoustical signals to the TBS RF signals and transmits the TBS RF signals.

3. The cordless telephone system recited in claim 2, wherein the cordless microphone is comprised of a microphone electrically connected to a separate transmitter pack.

4. The cordless telephone system as recited in claim 3, wherein both the microphone and separate transmitter pack are suitably adapted to be worn by an individual with hands free.

5. The cordless telephone system recited in claim 2, wherein the base unit further comprises a speaker to broadcast the corresponding electrical signals and other electrical signals communicated on the telephone network.

6. The cordless telephone system recited in claim 2, wherein the base unit further comprises a base unit transmitter to transmit the RBS RF signals corresponding to electrical signals communicated on the telephone network, the RBS communicating devices receiving the plurality of RBS RF signals transmitted by the base unit transmitter.

7. The cordless telephone system recited in claim 6, wherein the plurality of RBS communicating devices are cordless speaker units which convert the RBS RF signals received from the base unit transmitter to corresponding electrical speaker signals and broadcast the corresponding electrical speaker signals on a speaker in the cordless speaker units.

8. The cordless telephone system recited in claim 6, wherein the base unit transmits the RBS RF signals to the RBS communicating device in a selectable one of a plurality of predetermined frequency channels, and the plurality of RBS communicating devices receive the RBS RF signals transmitted by the base unit transmitter in a selected one of the plurality of frequency channels.

9. The cordless telephone system recited in claim 6, wherein the base unit is adapted to convert electrical signals communicated on the telephone network to audio in signals and transmit the audio in signals to the sound system.

10. The cordless telephone system recited in claim 6, wherein the RBS communicating device converts the received RBS RF signals to audio in signals and transmits the audio in signals to a sound system.

11. The cordless telephone system recited in claim 6, further comprising a sound system interface unit which includes the TBS communicating device and the RBS communicating device and wherein the TBS communicating device is adapted to receive audio out signals from the sound system and to convert the audio out signals to the TBS RF signals and the RBS communicating device converts the received RBS RF signals to audio in signals and transmits the audio in signals to the sound system.

12. The cordless telephone system recited in claim 11, wherein the base unit is adapted to receive audio out signals from a sound system and to convert the audio out signals to a corresponding electrical signals to communicate on the telephone network and to convert electrical signals communicated on the telephone network to audio in signals and transmit the audio in signals to the sound system.

13. The cordless telephone system recited in claim 11, wherein the base unit is adapted to convert electrical signals communicated on the telephone network to audio in signals and transmit the audio in signals to a sound system.

14. The cordless telephone system recited in claim 6, further comprising a cordless headset with a microphone, earphones, and a transceiver, the transceiver comprising the TBS communicating device and the RBS communicating device, wherein the TBS communicating device is adapted to receive audio out signals from the microphone and to convert the audio out signals to the TBS RF signals and the RBS communicating device converts the received RBS RF signals to audio in signals and transmits the audio in signals to the earphones.

15. The cordless telephone system recited in claim 14, wherein the transceiver for the cordless headset is suitably adapted to be worn by an individual and is electrically connected to the microphone and earphones.

16. The cordless telephone system recited in claim 15, wherein the transceiver for the cordless headset includes a keypad to remotely communicate call setup functions to the base unit.

17. The cordless telephone system recited in claim 1, wherein the base unit performs call setup functions.

18. The cordless telephone system recited in claim 1, wherein the base unit accesses the telephone network through a handset jack on a conventional telephone.

19. The cordless telephone system recited in claim 1, wherein the base unit receives the TBS RF signals transmitted by the TBS communicating device in a selectable one of a plurality of predetermined frequency channels, and the TBS communicating device transmitter preferably transmits the TBS RF signals in a selected one of the plurality of frequency channels.

20. A cordless telephone system, comprising:
a base unit to access a telephone network; and
a cordless microphone which converts acoustical signals to RF signals and transmits the RF signals,
wherein the base unit includes a receiver, to receive RF signals transmitted by the cordless microphone and converts the received RF signals to a corresponding electrical signal to communicate on the telephone network, the received RF signals also being broadcast on the same frequency by a base unit transmitter to a plurality of speaker devices.

21. A cordless telephone system, comprising:
a base unit to access a telephone network, including a base unit transmitter to transmit RF signals corresponding to electrical signals communicated on the telephone network;
a cordless microphone which converts acoustical signals to RF signals and transmits the RF signals;
the base unit including a receiver to receive RF signals transmitted by the cordless microphone and converts the received RF signals to corresponding electrical signals to communicate on the telephone network; and
a plurality of cordless speaker units which convert the RF signals received from the base unit transmitter to corresponding electrical speaker signals and broadcast the corresponding electrical speaker signals on a speaker.

\* \* \* \* \*